(12) United States Patent
Gorovoj et al.

(10) Patent No.: US 6,402,953 B1
(45) Date of Patent: Jun. 11, 2002

(54) ADSORPTION MEANS FOR RADIONUCLIDES

(75) Inventors: Leontiy F. Gorovoj, Kiew (UA); Valentin N. Kosyakov, Moskau (RU)

(73) Assignee: Rwe Nukem GmbH, Alzenau (DE)

( * ) Notice: Subject to any disclaimer, the term of this patent is extended or adjusted under 35 U.S.C. 154(b) by 0 days.

(21) Appl. No.: 09/622,066

(22) PCT Filed: Mar. 3, 1999

(86) PCT No.: PCT/EP99/01372

§ 371 (c)(1),
(2), (4) Date: Aug. 29, 2000

(87) PCT Pub. No.: WO99/46779

PCT Pub. Date: Sep. 16, 1999

(30) Foreign Application Priority Data

Mar. 10, 1998 (DE) ........................................ 198 10 094

(51) Int. Cl.⁷ ............................................. B01D 15/08
(52) U.S. Cl. .................... 210/635; 210/682; 210/198.2; 210/502.1; 210/656; 423/6; 536/20; 502/404
(58) Field of Search .................. 210/656, 660, 210/682, 635, 198.2, 502.1; 536/20; 423/6, 7; 502/404, 439

(56) References Cited

U.S. PATENT DOCUMENTS

| | | | | |
|---|---|---|---|---|
| 2,361,000 A | | 10/1944 | Zender | 536/20 |
| 3,993,558 A | * | 11/1976 | Prochazha | 210/682 |
| 5,010,181 A | | 4/1991 | Coughlin | 536/20 |
| 5,015,293 A | | 5/1991 | Mayer et al. | 117/144 |

FOREIGN PATENT DOCUMENTS

| | | | |
|---|---|---|---|
| DE | 19746300 | 10/1997 | 210/682 |
| DE | 19704651 | 3/1998 | 210/682 |
| FR | 2101276 | 3/1972 | 210/682 |
| GB | 2165865 | 4/1986 | 210/682 |
| GB | 2188135 | 9/1987 | 210/682 |
| GB | 2199315 | 7/1988 | 210/682 |
| GB | 2228259 | 8/1990 | 210/682 |
| GB | 2310205 | 8/1997 | 210/682 |
| JP | 62201571 | 2/1988 | 210/682 |
| JP | 01121342 | 5/1989 | 210/682 |
| JP | 04343762 | 11/1992 | 210/682 |
| JP | 04371161 | 9/1993 | 210/682 |
| JP | 08068893 | 5/1996 | 210/682 |
| RU | 2073015 | 2/1997 | 210/682 |
| WO | 931287 | 7/1993 | 210/682 |

OTHER PUBLICATIONS

"Recovery of Metal Ions by Microfungal Filters", Wales et al, J. Chem. Tech. Biotechnol. 1990, 49, pp. 345–355.
"Biosorption of Radionuclides by Fungal Biomass", White et al, J. Chem. Tech. Biotechnol. 1990, 49, pp. 331–343.
"Metal Recovery Using Chitosan", Onsoyen et al, J. Chem. Biotechnol, 1990, 49, pp. 395–404.
"Review of Biotechnology Applications to Nuclear Waste Treatment", Ashley et al, Chem. Tech. Biotechnol, 1990, 49, pp. 381–394.
"Chelating, Film–Forming, and Coagulating Ability . . . Industrial Wastes", Muzzarelli et al, Biotech. & Bioengineering, vol. XXII, 1980, pp. 885–895.
"Biosorption of zinc by Fungal Mycelial Wastes", Luef et al, Microbiol. Biotechnol. 1991, 34, pp. 688–692.
Accumulation of Uranium by Basidiomycetes, Nakajima et al, Microbial. Biotechnol. 1993, 38, pp. 574–578.
"Use of Fibrous Sorbents for . . . Natural Waters", Nikitin et al, Chem. Abstract 239932–vol. 113, No. 26, 24, 1990.
CAPLUS Abstracts: 348820 (1998); 183724 (1985); and 181328 (1998).

* cited by examiner

Primary Examiner—Ernest G. Therkorn
(74) Attorney, Agent, or Firm—Dennison, Schultz & Dougherty

(57) ABSTRACT

The invention relates to adsorption material for radionuclides based on a fine fibrous material containing chitin. The material is obtained from fungi and insoluble ferrocyanides of the transition metals, especially copper ferrocyanide. The adsorption material is especially well suited for cleaning liquid radioactive wastes produced in the atomic industry and by nuclear power stations.

11 Claims, No Drawings

US 6,402,953 B1

ADSORPTION MEANS FOR RADIONUCLIDES

REFERENCE TO RELATED APPLICATIONS

This application is a 371 of PCT/EP99/01372 filed Mar. 3, 1999.

The invention relates to chitin/chitosan adsorbents that can be used in the nuclear industry and in nuclear power stations for removing radioactive contaminants from aqueous solutions, in particular elements such as cesium, uranium, plutonium americium, curium etc. They can also be used for cleaning wastes and drinking water of toxic heavy metals, such as lead, mercury, cadmium, bismuth, chromium etc.

In the nuclear industry and in the operation of nuclear power stations, a large amount of radioactive effluent is generated. This effluent represents a high risk to the health of people and to the environment, and its storage is both expensive and unreliable. To reduce the risk from radioactive effluents, they are converted into a solid state. Of the many possible methods, the adsorption method has considerable advantages, one of the main ones being that a considerable reduction in the volume is possible. The efficiency of the method depends on the quality of the adsorbent. It has been found that chitin adsorbents have many useful properties.

Chitin is a natural aminosugar-containing polysaccharide of (1.4)-linked 2-deoxy-2-acetamido-$\beta$-D-glucose (N-acetyl-D-glucosamine). Chitosan is a deacetylated derivative of chitin. The high chemical and radioactive stability of chitin and chitiosan makes it possible to use these polymers for the extraction of radionuclides from aqueous solutions. The particular properties of the adsorption method have been investigated for many different radionuclides (Tsezos, 1980; Volesky, 1981; Muzzarelli, 1986; Muzzarelli et al. 1986; 1989; Erschov et al., 1992, 1993; Jansson-Charrier et al., 1994; Gorovoj, Kosyakov, 1994, 1996). Many of these works are concerned with the investigation of the potential for the extraction of uranium.

The sorption properties of chitin and its derivatives have proved sufficiently good for the extraction of uranium from aqueous solutions both in anionic and cationic form (Andreev et al., 1962). An effective method for the extraction of uranium from seawater was found in the use of chitin phosphate and chitosan phosphate, which result in a very high extraction rate (Sakaguchi, Taskashi et al., 1979, a, b, 1981). With this method, 1 g, of chitosan phosphate binds 2.6 mg of uranium if its content in seawater is 2.8 mg. An extraction rate of more than 90% is therefore achieved.

Crosslinked chitosan shows an increase in the adsorption of metals that attains 95%, this rise presumably being based on the amino group content (Kim, Choi, 1985 a). Chitosan showed here a better result than crosslinked chitosan (Kim, Choi, 1985 b). The adsorption of uranium by chitosan, which depends on the pH value, the size of the sorption particles and the presence of other metals, was investigated (Jansson-Charrier et al., 1994). The maximum adsorption was achieved with a pH value of 5, namely up to 400 mg/l. A drop in the size of the sorption particles showed a positive effect on the kinetics of the sorption process, which points to the limiting factor of diffusion. The adsorption of uranium fell when carbonates and phosphates were present.

The kinetics (speed) of uranium adsorption by chitosan is slow: a considerable improvement is however achieved when the chitosan is modified to chitosan phosphate or dithiocarbamate. In this case, the adsorption takes place in the first 15 minutes. The highest adsorption indexes for uranium were achieved with the derivative N-[2(1,2-dehydrooxyethl)tetrahydrofuryl] chitosan, which has a capacity of up to 800 mg/g (Muzzarelli et al., 1984).

The bioadsorption of uranium also occurs very easily in the chitin of the cell walls of fungi, in particular rhizopus arrhizus (Tsezos, Volesky, 1982 a; Tsezos, 1983). It was demonstrated that with a pH value of 2 the state of balance is reached after 3 to 4 hours, and during this time 1 mg of uranium is adsorbed per 1 g of cell wall. With a pH value of 4, up to 180 g of uranium are adsorbed in the cell walls, while pure chitin absorbs only 6 mg(g of uranium with this pH value, even though the cell walls of the fungi are not 100% chitin.

The use of chitin for cleaning of water contaminated with radioactive substances, in particular plutonium, can present a solution for the problem of neutralizing the waste generated during the extraction, enrichment and use of nuclear fuels. The contact between chitin particles and radioactive liquid is achieved by a multiple-stage mixing and settling process, counterflow process and passage through towers. The cleaned water and the contaminated chitin are separated with the aid of gravity separation or filtration. Using this method, more than 80% of the plutonium can be extracted from aqueous solutions with a pH value of between 5 and 10 (Silver, 1978).

It is known that chitin and the chitin-containing material chisit-03 effectively extracts plutonium (IV), americium (III) and curium (III). The distribution coefficients rise in the order: Pu(IV)<Cm(III)<Am(III). The adsorption of Pu(V) and Pu(VI) by chisite-03 is considerably better than the adsorption by chitin, and is comparable with that of Pu(IV) (Ershov et al., 1992 a).

The high radiation stability of chitin and chitosan has made it possible to perform the investigation of these materials for the concentration of effluents from nuclear fuels (radioactive isotopes of cesium, zirconium, hafnium and other elements) from water circulating in reactor cooling systems. Cesium is, like other alkaline metals, not adsorbed by chitin and chitosan. Of the other nuclear fission elements, tests were conducted on rare-earth elements such as cerium, europium, thulium and terbium (Muzzarelli et al., 1972; Lopez de Alba et al., 1988 a). The extraction rate (in %) of these metals by chitin was low, between 3 and 9%. Chitosan had better results, but these too were not high: between 30 and 45%. The extraction of ruthenium from waste water from the nuclear power station at Marcoulle also showed poor results. Up to 2 and 4% of this metal were adsorbed in chitin, and up to 60% in chitosan (Muzzarelli, 1970, 1977). Chitin/chitosan-containing material of fungi (higher basidiomycetes) showed better adsorption results for uranium, plutonium, americium, curium and heavy metals (Gorovoj, Kosyakov, 1994, 1996; Kosyakov et al., 1997).

The use of a chitin adsorbent for extraction of radionuclides from aqueous solutions was promising in this respect. There are however unsolved problems in this field which do not permit the industrial use of chitin adsorbents. The main problem is that it is not possible to remove cesium isotopes from radioactive effluents. Cesium is a principal component in the radioactive contamination of effluents both in nuclear technology and in nuclear power stations. Another drawback of the known chitin adsorbent is the low efficiency of extraction of plutonium ions and other radionuclides from effluent. These drawbacks practically prevent any solution to the cleaning of radioactive effluents.

The problem underlying the present invention was therefore to provide an adsorbent for radionuclides, such as cesium, transuraniums etc. with which the problems occurring to date can be solved.

This problem is solved by the present invention.

The subject matter of the invention is an adsorbent.

A further subject matter is a process for the manufacture of the adsorbent in accordance with the invention.

A further subject matter is also a process for the cleaning of salt-containing radioactive effluents.

A further subject matter is also the use of an adsorbent in accordance with the invention for the cleaning of radioactive effluents, in particular from the nuclear industry and from nuclear power stations.

In accordance with the present invention, new properties are imparted to the chitin-containing material obtained from fungi (higher basidiomycetes) in order to adsorb radioactive cesium from water and concentrated saline solutions. In accordance with the invention, it is also possible to improve considerably the adsorption properties of a chitin-containing material in respect of such radionuclides, for example uranium, plutonium, americium and curium.

This is achieved in accordance with the invention by incorporating ferrocyanides of the transition metals in a chitin-containing material, for example copper ferrocyanide, allowing it to be converted into a microcrystalline insoluble state. At the expense of their reactive groups, they become a new adsorbent capable of combining with radioactive cesium. The ferrocyanide microcrystals loosen the adsorbent matrix and increase their surface, and improve the penetration of a solution to the reactive centers of chitin.

A chitin-containing material for manufacture of an adsorbent from natural or cultivated fungi (higher basidiomycetes) is described in the Russian patent 2073015 (Gorovoj, Kosyakov, 1997).

To impart adsorption properties to a chitin-containing material in respect of radioactive cesium, it is proposed to incorporate additional reactive groups which are effective for combining with this chemical element. To increase the adsorption properties in respect of plutonium or other radionuclides, it is proposed to increase the possibility for a contact of heavy metal ions with reactive centers of the chitin by loosening the structure of the chitin-containing material.

In accordance with the invention, ferrocyanides of transition metals are proposed as the preferable modifying substances. Ferrocyanides comprise normal salts (e.g. $Me_2Fe(CN)_6$) and mixed salts $[M_{4-2x}Me_xFe(CN)_6]$, in which M is a monovalent metal cation and Me a bivalent cation of a transition metal. Ferrocyanides of transition metals show a high selectivity in respect of ions of heavy alkali metals, including the radioactive isotopes of cesium. Copper ferrocyanide has several advantages when compared with ferrocyanides of other metals: it has the lowest solubility (approx. $10^{-5}$ mol/l) and the highest distribution coefficients for cesium ($K_d=5.10^5$).

Insoluble ferrocyanides of transition metals can be obtained by direct precipitation as the result of reduction of suitable soluble ferrocyanides in accordance with the following reaction equation:

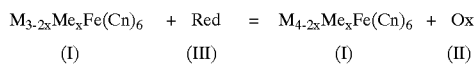

where Red=reduction means, Ox=oxidation means Chitin-containing materials have certain reduction properties.

If $K^+$ and $Fe(CN)_6^{4-}$ ions are present, the reaction can lead to the formation of various compounds:

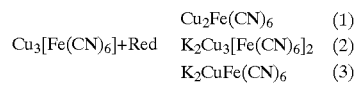

For the reaction to lead to (1), the 1:2 ratio of $Cu^{2+}$ to $Fe(CN)_6^{4-}$ must be retained, and the reaction performed in an ammonia solution with an ammonia concentration of 0.1 to 2 mol/l. Experiments have confirmed that the preferred concentration of ammonia in a solution is in the range from 0.3 to 0.7 mol/l.

The chitin-containing material described in Russian patent 2073015 represents a chitin-glucane-melanin complex of natural biopolymers from a cell wall of fungi (higher basidiomycetes). The material has a fine-fibered structure. Chitin is present in the form of microfibrils with a diameter of 150 to 250 Å and a length from up to 1 to up to 2 μm. The chitin microfibrils are inside the amorphous glucane-melanin matrix, thus assuring that a microfibril spatial network structure is maintained. At the same time, the glucane-melanin complex prevents direct contact by chitin microfibrils with the solution, which reduces the effectiveness of the extraction of radionuclides such as uranium, plutonium, americium, curium etc. and heavy metals.

This drawback is avoided in accordance with the invention, and the contact of a solution with chitin microfibrils is improved by loosening the glucane-melanin matrix by means of introducing ferrocyanide microcrystals into the matrix mass. To achieve this, the material is impregnated with soluble salts containing $Cu^{2+}$ and $Fe(CN)_6^{3-}$, and reduction is then performed. To achieve the conversion, it is necessary to add ammonia to the suspended material. Inside and on the surface of the glucane-melanin matrix, microcrystals of copper ferrocyanide are formed that loosen the matrix.

The invention is now demonstrated with the following examples, without being restricted to these:

EXAMPLE 1

The initial material for manufacture of an adsorbent was obtained from mycelium mass of the basidiomycete fungus Coltricia perennis (L.: Fr.) Murr. To do so, the dry fruitbody was cleaned of sand, cut into pieces and ground to a homogeneous mass. 1 kg of dry biomass was placed into 10 liters of a 10% aqueous $NH_3$ solution and subjected to a temperature of 20° C. and a constant grinding for one hour. Then the solid mass was separated from the fluid and washed five times with pure water in proportions of 15 liters. The chitin-containing material obtained is suitable for the manufacture of an adsorbent.

The washed material was suspended in water (in a ratio of 1:75). 3.3 mol equivalents of $Cu^{2+}$ and 2.2 mol equivalents of $Fe(CN)_6^{3-}$ were then added to the suspension per kg of dry material. This mixture was subjected for one hour to homogenization (grinding), and ammonia was added to obtain a solution of 0.5 mol/l. Then the suspension was subjected to a two-hour homogenization. The adsorbent obtained by separation from the fluid was washed three times with pure water and then dried. It contained on the surface and in the inside of the fibers 1.1% of $Cu_2Fe(CN)_6$.

EXAMPLE 2

The initial material for manufacture of an adsorbent was obtained from mycelium mass of the basidiomycete fungus Coriolus hirsutus (Wulf.: Fr.) Quel. To do so, the dry fruitbody was stripped of bark, cut into pieces and ground to a homogeneous mass. 1 kg of dry biomass was placed into 15 liters of a 10% aqueous $NH_3$ solution and subjected to a temperature of 20° C. and a constant homogenization for two hours. The solid mass separated from the fluid was washed five times with pure water in proportions of 15 liters each. The chitin-containing material obtained is suitable for the manufacture of an adsorbent.

The washed material was suspended in water (in a ratio of 1:25). 3.3 mol equivalents of $Cu^{2+}$ and 2.2 mol equivalents of $Fe(CN)_6^{3-}$ were then added to the suspension per kg of dry material. This mixture was subjected for one hour to homogenization, and ammonia was added to obtain an ammonia solution of 0.4 mol/l. Then the suspension was subjected to a two-hour homogenization. The adsorbent obtained was separated from the fluid, washed three times with pure water and then dried. It contained on the surface and in the inside of the fibers 0.13% of $Cu_2Fe(CN)_6$.

EXAMPLE 3

The initial material for manufacture of an adsorbent was obtained from mycelium mass of the basidiomycete fungus Coriolus versicolor (L.: Fr.) Quel. To do so, the dry fruitbody was stripped of bark, cut into pieces and ground to a homogeneous mass. 1 kg of dry biomass was placed into 20 liters of a 10% aqueous $NH_3$ solution and subjected to a temperature of 40° C. and a constant homogenization for four hours. The solid mass separated from the fluid was washed five times with pure water in proportions of 15 liters each. The chitin-containing material obtained is suitable for the manufacture of an adsorbent.

The washed material was suspended in water (in a ratio of 1:75). 10 mol equivalents of $Cu^{2+}$ and 6.6 mol equivalents of $Fe(CN)_6^{3-}$ were then added to the suspension (for 1 kg of dry material). This mixture was subjected for one hour to homogenization, and ammonia was added to obtain an ammonia solution of 0.6 mol/l. Then the suspension was subjected to a two-hour homogenization. The adsorbent obtained was separated from the fluid, washed three times with pure water and then dried. It contained on the surface and in the inside of the fibers 3.2% of $Cu_2Fe(CN)_6$.

EXAMPLE 4

The initial material for manufacture of an adsorbent was obtained from mycelium mass of the basidiomycete fungus Coriolus zonatus (Nees: Fr.) Quel. To do so, the dry fruitbody was stripped of bark, cut into pieces and ground to a homogeneous mass. 1 kg of dry biomass was placed into 10 liters of a 10% aqueous $NH_3$ solution and subjected to a temperature of 60° C. and a constant homogenization for two hours. The solid mass separated from the fluid was then washed five times with pure water in proportions of 15 liters each. The chitin-containing material obtained is suitable for the manufacture of an adsorbent.

The washed material was suspended in water (in a ratio of 1:25). 10 mol equivalents of $Cu^{2+}$ and 6.6 mol equivalents of $Fe(CN)_6^{3-}$ were then added to the suspension (for 1 kg of dry material). This mixture was subjected for one hour to homogenization, and ammonia was added to obtain an ammonia solution of 0.9 mol/l. Then the suspension was subjected to a two-hour homogenization. The adsorbent obtained was separated from the fluid, washed three times with pure water and then dried. It contained on the surface and in the inside of the fibers 1.0% of $Cu_2Fe(CN)_6$.

EXAMPLE 5

The initial material for manufacture of an adsorbent was obtained from mycelium mass of the basidiomycete fungus Daedalea quercina (L.: Fr.) Quel. To do so, the dry fruitbody was stripped of bark, cut into pieces and ground to a homogeneous mass. 1 kg of dry biomass was placed into 10 liters of a 20% aqueous $NH_3$ solution and subjected to a temperature of 80° C. and a constant homogenization for two hours. The solid mass separated from the fluid was then washed five times with pure water in proportions of 15 liters each. The chitin-containing material obtained is suitable for the manufacture of an adsorbent.

The washed material was suspended in water (in a ratio of 1:75). 15 mol equivalents of $Cu^{2+}$ and 6.6 mol equivalents of $Fe(CN)_6^{3-}$ were then added to the suspension (for 1 kg of dry material). This mixture was subjected for one hour to homogenization, and ammonia was added to obtain an ammonia solution of 0.5 mol/l. Then the suspension was subjected to a two-hour homogenization. The adsorbent obtained was separated from the fluid, washed three times with pure water and then dried. It contained on the surface and in the inside of the fibers 11.2% of $Cu_2Fe(CN)_6$.

EXAMPLE 6

The absorbent properties of the adsorbents obtained (Examples 1 to 5) were tested statically. To do so, a model solution of the isotope Cs-137 was manufactured with an activity of $2.10^7$ Ci/l in drinking water with a pH value of 5–7. 20 mg of an absorbent were added to 400 ml of the solution and then kept continuously homogenized. In a specified time (1, 3, 15 and 30 days) the concentration of Cs-137 in the solution was determined and the distribution coefficient ($K_d$) calculated using the formula:

$$K_d = (A_s \cdot A_{aq})/(A_{aq} \cdot M_s),$$

where $A_s$ and $A_{aq}$ are the activity of the radionuclide in the adsorbent and in the aqueous phase, $V_{aq}$ the volume of the aqueous phase in ml, and $M_s$ the weight of the air-dried adsorbent in g.

The results are set forth in Table 1.

TABLE 1

| | Content of $Cu_2Fe(CN)_6$ | Cs-137 distribution coefficients in ml/g, after | | | |
|---|---|---|---|---|---|
| Examples | (%) | 1 day | 3 days | 15 days | 30 days |
| 1 | 1.1 | $1.0 \times 10^4$ | $2.4 \times 10^4$ | $0.6 \times 10^5$ | $1.0 \times 10^5$ |
| 2 | 0.13 | $0.6 \times 10^4$ | $0.9 \times 10^4$ | $0.2 \times 10^5$ | $0.2 \times 10^5$ |
| 3 | 3.2 | $1.5 \times 10^4$ | $3.4 \times 10^4$ | $1.2 \times 10^5$ | $1.0 \times 10^5$ |
| 4 | 1.0 | $1.2 \times 10^4$ | $2.6 \times 10^4$ | $0.8 \times 10^5$ | $1.2 \times 10^5$ |
| 5 | 11.2 | $1.8 \times 10^4$ | $4.1 \times 10^4$ | $1.3 \times 10^5$ | $1.3 \times 10^5$ |

Chitin-containing materials without $Cu_2Fe(CN)_6$ showed practically no adsorption properties in respect of Cs-137. Under the same experimental conditions, the distribution coefficients did not exceed 28.

EXAMPLE 7

The adsorbent in accordance with example 5 was tested on real radioactive effluents generated in operation of a nuclear power station. These are specific effluents distinguished by a high content of various salts. Known adsorbents for radioactive cesium are not effective in concentrated saline solutions. The tests were performed on columns with a volume of 100 ml, into which 10 g of the adsorbent were added. The speed of the admixture of the fluid was one column volume per hour. The pH value of the solutions was set to 5 to 7. The measurements of the radioactivity were performed after filtration of the fluid in a quantity of 100 column volumes. The results of the extraction of radioactive cesium from water and saline solutions are given in Table 2.

TABLE 2

| Effluents | Salt content in g/l | Cs-134 + Cs-137, radioactivity, Ci/l | | Cleaning (%) |
|---|---|---|---|---|
| | | Initial value | End value | |
| 1 | <0.1 | $3.2 \times 10^{-6}$ | $1.9 \times 10^{-10}$ | 99.994 |
| 2 | 206 | $2.6 \times 10^{-7}$ | $1.8 \times 10^{-9}$ | 99.3 |
| 3 | 10.4 | $8.3 \times 10^{-5}$ | $2.4 \times 10^{-8}$ | 99.97 |
| 4 | 11.2 | $4.2 \times 10^{-4}$ | $1.9 \times 10^{-7}$ | 99.95 |
| 5 | 107 | $6.0 \times 10^{-3}$ | $1.8 \times 10^{-8}$ | 99.9997 |
| 6 | 240 | $6.1 \times 10^{-6}$ | $1.0 \times 10^{-9}$ | 99.98 |
| 7 | 317 | $5.3 \times 10^{-4}$ | $4.7 \times 10^{-8}$ | 99.991 |
| 8 | 446 | $2.3 \times 10^{-4}$ | $2.1 \times 10^{-8}$ | 99.991 |

The extraction of radioactive cesium from these solutions by a chitin-containing material without $Cu_2Fe(CN)_6$ did not exceed 6%.

EXAMPLE 8

Tests on the exchange capacity of the adsorbent were performed on real radioactive effluents from a nuclear power station. The content of salts in the solution was 317 g/l (example 7, Table 2). The pH value of the solutions was set to 6. The experimental conditions were similar to those in Example 7. 700 column volumes of filtrated fluid were passed through a column with the adsorbent. The measurements of the Cs-134+Cs-137 activity were performed after each 100 volumes of filtrated solution. The results are shown in Table 3.

TABLE 3

| Column volumes | Degree of radioactivity after filtration, Ci/l |
|---|---|
| 0 (initially) | $5.3 \times 10^{-1}$ |
| 100 | $4.7 \times 10^{-5}$ |
| 200 | $1.8 \times 10^{-7}$ |
| 300 | $2.5 \times 10^{-7}$ |
| 400 | $3.7 \times 10^{-7}$ |
| 500 | $7.6 \times 10^{-7}$ |
| 600 | $1.3 \times 10^{-7}$ |
| 700 | $1.7 \times 10^{-7}$ |

This experiment shows the dependability of the adsorbent in accordance with the invention in concentrated saline solution. Even after the filtration of 700 column volumes of this solution, a cleaning effect of more than 99.9% (removal of radioactive cesium) is achieved. This exceeds the effect of all known adsorbents.

EXAMPLE 9

Chitin-containing material obtained from the fungi of Example 1 to 5 possesses the properties of adsorbents in respect of uranium, plutonium, americium, curium etc. (Gorovoj, Kosyakov, 1997; Kosyakov et al., 1997). The sorption material obtained in accordance with the invention considerably outdoes the original material in respect of the distribution coefficients of the radioactive transuraniums.

For the experiments, solutions with Pu-239 and Am-241 were used. The radioactivity of the initial solutions was 1000 Bq/l. The salt content was set to 60 g/l. The pH value of the solutions was set at 6.5. The extraction of the radionuclides was performed statically. 500 mg of a chitin-containing material or 500 mg of the adsorbent in accordance with the invention were added to 50 ml of a radioactive solution. The suspension was mixed for 30 minutes, centrifuged, and the radionuclide content determined in the liquid phase. The distribution coefficient ($K_d$) was calculated in accordance with the formula (see Example 6). The results are set forth in Table 4.

TABLE 4

| Adsorbent | $K_d$, ml/g | |
|---|---|---|
| | Pu-239 | Am-241 |
| Chitin-containing material | 1500 | 5900 |
| Adsorbent (invention) | 8400 | 15000 |

What is claimed is:

1. An adsorbent for radionuclides and heavy metals comprising a fine-fibered chitin-containing material obtained from natural fungi fungi obtained by culture, wherein said adsorbent contains insoluble ferrocyanide of the transition metals in the form of microcrystals inside the matrix mass and on the surface of fibers of a chitin-containing material.

2. Adsorbent according to claim 1, wherein the insoluble ferrocyanide is copper ferrocyanide.

3. A process for manufacture of the adsorbent according to claim 1, wherein chitin-containing mass is impregnated with $Cu^{2+}$ and $Fe(CN)_6^{3-}$ salts and then converted into a microcrystalline insoluble state in an ammonia medium.

4. Process according to claim 3, wherein the ratio of $Cu^{2+}$ to $Fe(CN)_6^{3-}$ is 1:2.

5. Process according to claim 3, wherein it is performed with an ammonia concentration of 0.1 to 2 mol/l.

6. Process according to claim 5, wherein it is performed with an ammonia concentration of 0.3 to 0.7 mol/l.

7. Process for cleaning of salt-containing radioactive effluents by passing salt containing radioactive effluents through an absorbant according to claim 1 in a column or retained statically.

8. Process according to claim 7 wherein the contact time of the adsorbent with a solution to be cleaned is no less than 5 minutes.

9. Process according to claim 8, wherein the contact time of the adsorbent with a solution to be cleaned is 30 to 120 minutes.

10. Process according to claim 7, wherein the pH value of the solution to be cleaned is set from 3 to 11.

11. Process according to claim 10, wherein the pH value of the solution to be cleaned is set from 5 to 8.

* * * * *